United States Patent Office 3,790,566
Patented Feb. 5, 1974

3,790,566
CARBAMATE ESTERS OF 2-OXYIMINO-3-KETO-1,4-DIHETEROCYCLICS
Russell F. Bellina, Claymont, Del., assignor to E. I. du Pont de Nemours and Company, Wilmington, Del.
No Drawing. Filed Aug. 12, 1971, Ser. No. 171,388
Int. Cl. C07d 93/10
U.S. Cl. 260—243 R  6 Claims

ABSTRACT OF THE DISCLOSURE

Chemical compounds of the class of carbamate esters of 2-oxyimino-3-keto-1,4-diheterocyclics, such as 2-methylcarbamoyloxyimino-4-methyl-3-thiomorpholinone useful in controlling pests such as insects and nematodes.

BACKGROUND OF INVENTION

Copending application Ser. No. 851,531 filed July 9, 1969, now U.S. Pat. No. 3,658,870, discloses alkyl 1-carbamoyl-N-(substituted carbamoyloxy)thioformimidates and their use as pesticides. The compounds of the present invention are structurally distinct from the compounds of this earlier application.

SUMMARY OF INVENTION

This invention relates to carbamate esters of 2-oxyimino-3-keto-1,4-diheterocyclics of the following formula:

(I)

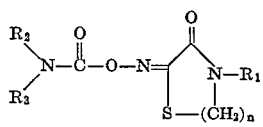

wherein $R_1$ is hydrogen, alkyl of 1–6 carbon atoms, alkenyl of 3–4 carbon atoms or alkylnyl of 3–4 carbon atoms;
$R_2$ is hydrogen, alkyl of 1–3 carbon atoms or allyl;
$R_3$ is hydrogen or methyl; and
$n$ is 2, 3 or 4.

Preferred because of ease of synthesis and higher activity are those compounds of Formula I where $R_1$ is alkyl of 1–3 carbon atoms or allyl;
$R_2$ is hydrogen, alkyl of 1–2 carbon atoms or allyl;
$R_3$ is hydrogen or methyl; and
$n$ is 2 or 3.

Most preferred because of highest activity are 2-methylcarbamoyloxyimino-4-methyl-3-thiomorpholinone and 2-methylcarbamoyloxyimino-4-ethyl-3-thiomorpholinone.

The compounds of Formula I can exist in either or both the syn or anti geometric isomers.

Compounds of Formula I exhibit excellent pesticidal activity combined with a good margin of safety for host plants and mammals. Thus, these compounds are highly useful in protecting plants from predacious pests such as insects and nematodes. In particular these compounds control a wide variety of arthropods under various conditions at relatively low dosages.

The compounds of Formula I are prepared by carbamylating intermediate 2-oxyimino-3-keto-1,4-diheterocyclics. The latter form a novel class of compounds of the formula:

(II)

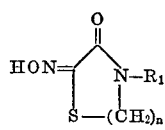

wherein $R_1$ and $n$ are defined as above for the compounds of Formula I.

A further embodiment of the present invention involves a novel method of preparing the compounds of Formula II wherein a 1-alkoxycarbonylformhydroxamyl chloride [Berichte 88, 133 (1955)] is reacted with an aminothiol or aminothiolhydrohalide in the presence of base.

DETAILED DESCRIPTION OF INVENTION

Preparation

The compounds of Formula I wherein both $R_2$ and $R_3$ are hydrogen are prepared by allowing an appropriate 2-oxyimino-3-keto-1,4-diheterocyclic of Formula II to react with sodium cyanate and hydrochloric acid at low temperature. The reaction is illustrated by Equation A:

(A)

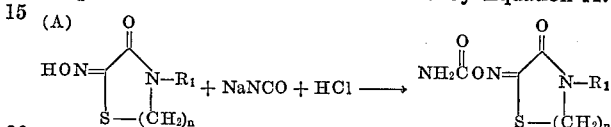

The compounds of Formula I wherein only one of $R_2$ and $R_3$ is hydrogen are prepared by allowing an appropriate intermediate of Formula II to react with a substituted isocyanate in an inert solvent such as acetone or acetonitrile. The reaction is illustrated by Equation B:

(B)

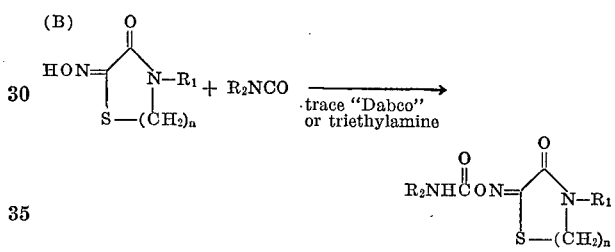

The compounds of Formula I wherein neither $R_2$ nor $R_3$ is hydrogen are prepared by allowing an appropriate intermediate of Formula II to react with sodium hydride in a solvent such as dioxane and treating the resulting salt with a substituted carbamoyl chloride. The reaction is illustrated by Equation C:

(C)

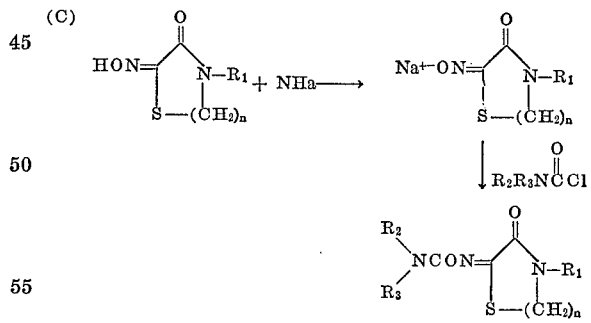

The intermediates of Formula II are made by allowing an alkoxycarbonylformhydroxamyl chloride to react with an appropriate aminothiol or aminothiol hydrohalide followed by the addition of the correct amount of base. The reaction is illustrated by Equation D:

(D)

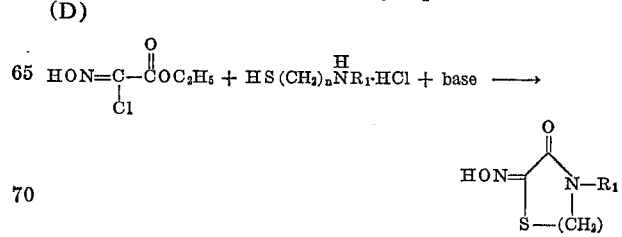

Suitable bases in the illustrated reaction can be a tertiary amine such as triethylamine, pyridine, or an alkali metal base such as sodium hydroxide or sodium methoxide. At least two equivalents of base should be employed in the illustrated reaction where a hydrohalide salt of aminothiol is used as a reactant. If the free aminothiol is used one equivalent of base is usually adequate.

Pests controlled

The compounds of this invention control a wide variety of arthropods under many different conditions at low dosages. They have been found to be essentially non-injurious to plants at relatively high rates of application. Arthropods controlled by the compounds of this invention include, but are not limited to: aphids such as *Aphis fabae, Myzus persicae, Macrosiphum euphorbiae,* and others; weevils such as *Anthonomus grandis, Hypera postica, Hypera punctata,* and others; lepidopterous larvae such as *Prodenia eridania, Heliothis zea, Heliothis virescens, Pectinophora gossypiella, Pieris rapae, Trichoplusia ni, Plutella maculipennis, Manduca sexta, Plodia interpunctella;* thrips such as *Scirtothrips citri, Frankliniella tritici, Chaetoanaphothrips orchidii, Thrips tabaci,* and others; flies such as *Musca domestica* and *Stomoxys calcitrans;* mosquitoes such as Anopheles spp., Culex spp., and Aedes spp.; tarnished plant bugs, Lygus spp. and other mirids; grasshoppers such as Melanoplus spp., Camnula spp., and others; ticks such as Boophilus spp., Dermacentor spp., and others; fleas such as Ctenocephalus spp, Pulex spp., Xenopsylla spp., and others; lice such as Pediculus spp., Linognathus spp., Bovicola spp., and others; the cotton stainer, *Dysdercus suturellus;* and mites such as Tetranychus spp., *Panonychus ulmi,* and others.

In addition many of the compounds of the invention also control nematodes. Illustrative of nematodes controlled are: *Melodogyne incognita,* root knot; Trichodorus spp. stubby root; *Tylenchorhynchus claytoni,* tobacco stunt; Xiphinema spp.; dagger; Helicotylenchus spp., spiral; Hoplolaimus spp., lance; Pratylenchus spp., lesion; Paratylenchus spp., pin; and *Rotylenchulus reniformus,* reniform nematodes.

Formulations

Compositions of this invention suitable for practical use will include one or more compounds of Formula (I) and can include surface-active agents, solid or liquid diluents and other materials as desired to produce wettable powders, suspensions, emulsifiable concentrates, dusts, pellets, solutions, granules, or high-strength compositions.

The surface-active agents or surfactants, as they are sometimes called, useful in the formulations of this invention act as wetting, dispersing and emulsifying agents which assist dispersion of the active material in a spray. Additionally, the surfactants act as spreaders which aid in obtaining even coverage of the surfaces to be protected from insects and other pests. The surfactants can include such anionic, non-ionic and cationic agents as have been used heretofore in pesticidal compositions of similar type. A detailed list of such agents may be found in "Detergents and Emulsifiers Annual," (John W. McCutcheon, Inc. 1970).

Anionic and non-ionic surfactants are preferred. Among the anionic surfactants, preferred ones are alkali and alkaline earth salts of alkylarylsulfonic acids, such as dodecylbenzenesulfonates and alkylnaphthalenesulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isothionate. Among the non-ionic surfactants, preferred ones include octylphenyl, nonylphenyl and dodecylphenyl polyethylene glycol ethers, polyoxyethylene derivatives of sorbitan fatty esters and long-chain alcohols and mercaptans, as well as polyoxyethylene esters of fatty acids.

Preferred dispersants are alkali and alkaline earth salts of lignosulfonic acids, salts of polymerized alkylarylsulfonates which are sold under the "Daxad" and "Darvan" trademarks, as well as methylcellulose, polyvinyl alcohol and the like.

Surfactants can be used in compositions of this invention in amounts of up to 15% by weight based on the total weight of the resulting insecticidal composition.

The compositions can contain, with or without a surfactant, a finely divided solid diluent such as natural silicates, e.g., talc, sepiolite, pyrophyllite; clays, e.g., montmorillonite, kaolinite, attapulgite; diatomaceous earth, synthetic magnesium silicate, synthetic silicas, calcium silicate, calcium sulfate, calcium carbonate, calcium phosphate, and flours derived from natural sources such as walnut shell, redwood, cottonseed and the like. The finely divided solids can be used in the compositions of this invention at a concentration of 1 to 98% by weight based on the total weight of the resulting pesticidal composition. Preferred finely divided solid formulations are high-strength compositions and powders containing 2 to 25% of synthetic silica and 75 to 98% active ingredients; and wettable powders containing 5 to 75% active ingredients, 1 to 5% surfactants, the remainder being finely divided solid diluents.

Organic liquids which are suitable for the preparation of solutions, suspensions and emulsifiable concentrates of the compounds of this invention include alcohols, glycols, Cellosolves, carbitols, ketones, esters, sulfamides, amides, paraffinic hydrocarbons, aromatic hydrocarbons, and halogenated hydrocarbons. Solvent combinations in which water-miscible solvents are combined with water, are particularly useful. Ordinarily, solvent choice is dictated by the solubility of the active compound to be used and whether a suspension or solution is desired.

Powder and dust preparations can be made by blending the active ingredient, with or without surfactant, with finely divided solids such as talcs, natural clays, pyrophyllite, diatomaceous earth; flours such as walnut shell, wheat, redwood, soya bean and cotton seed; or inorganic substances such as magnesium carbonate, calcium carbonate, calcium phosphate, sulfur and lime. The compositions are made by thoroughly blending the active ingredient with the diluent and other additives. Usually a grinding step, as in a hammer mill or fluid energy mill, is included. The particles in powder and dust preparations are preferably less than 50 microns in average diameter.

Preferred wettable powder formulations will contain 40% or more active ingredient together with sufficient surfactant and inert diluent to permit dispersion in water for spray application.

Suspension formulations can be made in water or in organic solvents, or in mixtures of water and water-miscible organic solvents, in which the active ingredient is insoluble and remains suspended. They are prepared by mixing and sandgrinding a slurry of insoluble active ingredient in the presence of dispersing agents to obtain a concentrated slurry of very finely-divided particles in which the active ingredient is substantially all below 5 microns in size. Preferred carriers include aliphatic, aromatic and chlorinated hydrocarbons, and vegetable and animal oils. Surfactants, viscosity control agents, anti-microbial agents and other modifiers may be used.

Solution formulations contain 20 to 50% active ingredient and 50 to 80% solvent or solvent-surfactant combinations. Preferred solvents are methanol, dimethyl formamide, "Cellosolve," aqueous mixtures of these solvents, isophorone and combinations of any of these. Other solvents include ketones, esters, and ethers. Solutions are prepared by stirring the combined ingredients; in some cases warming may speed solution and in others cooling or pressure may be required to prevent evaporation of the solvent.

Emulsifiable concentrates are usually solutions or suspensions of active material in non-water-miscible solvents together with surfactants. Suitable surfactants are those anionic or non-ionic agents known to the art as emulsifying agents. Such compounds can be found listed by J. W. McCutcheon in "Detergents and Emulsifiers Annual" (1970) by John W. McCutcheon, Inc. Emulsifying agents most suitable for the compositions of this invention are alkylaryl polyethoxy alcohols, alkyl and alkylaryl polyether alcohols, polyoxyethylene sorbitol or sorbitan fatty acid esters, polyethylene glycol fatty esters, fatty alkylol amide condensates, amine salts of fatty alcohol sulfates plus long chain alcohols, oil soluble petroleum sulfonates, alkylphenoxy polyethoxy phosphates and alkyloxy polyethoxy phosphate esters. Such emulsifying agents will comprise from about 3 to 10 weight percent of the total composition.

Thus, emulsifiable compositions of the present invention will consist of from about 25 to 50 weight percent active material, about 40 to 72 weight percent carrier liquid, and to 15% weight percent emulsifier, as these terms are defined and used above.

Formulations in the form of granules are physically stable, particulate compositions containing a compound of Formula I which adheres to or is distributed through a basic matrix of a coherent, inert carrier with macroscopic dimensions. In order to aid leaching of the active ingredient from the granule, a surfactant can be present.

Suitable carriers are preferably of mineral origin such as natural clays, some pyrophyllites, vermiculite and ground corn cobs. Suitable surfactants are anionic or non-ionic.

For the granule compositions of this invention, most suitable carriers are of two types. The first are porous, absorptive, preformed granules, such as preformed and screened granular attapulgite or heat expanded, granular, screened vermiculite. On such preformed granules, an organic or aqueous solution of the active agent can be sprayed and will be absored at concentrations up to 25 weight percent of the total weight.

Preformed granules can also be treated with a melt of active ingredient if the active ingredients melting point is sufficiently below its decomposition temperature. When this means of application is used, the active ingredient in a very finely divided form is deposited on the surface of the granules such as by tumbling in a mixer. The finely divided active agent can if desired contain minor amounts of diluents such as synthetic silicas, natural clays and surface active agents. After the active agent is distributed on the granules the granules are heated to above the melting point of the active agent preferably while tumbling is continued. The granules are then cooled and contain active ingredient within as well as fixed on their surfaces.

The second type of carrier suitable for granules is initially in a powder form. Powdered kaolin clays, hydrated attapulgite or bentonite clays such as sodium, calcium and magnesium bentonite are blended with the active ingredient and the mixtures are then granulated or pelletized by conventional means. Water soluble salts can be included in the compositions to aid in disintegration of the granules and pellets in the presence of moisture. Such granules or pellets can be made containing 25 to 50 weight percent of active ingredient, but more frequently a concentration of 5 to 10 percent is preferred for optimum distribution. Such granular compositions are most useful in a size range of 15 to 60 mesh (U.S.S.), i.e. 0.25 to 1.4 millimeters.

Additional modifiers can be used to advantage in the compositions of this invention. Thus, although the compounds of Formula I are quite stable under most conditions, the use of a desiccant, buffering agent or materials such as urea, which inactivate catalytic sites on diluent particles can prove desirable. Additives which will inhibit corrosion, reduce foam, reduce caking and increase fluocculation can also be used.

The compounds of this invention can be mixed with fungicides, bactericides, other acaricides, other nematicides, other insecticides or still other biologically active compounds in order to achieve desired results with a minimum expenditure of time, effort and material. Amounts of these biologically active materials added for each part by weight of the compounds of this invention may vary from .025 to 10 parts by weight. Suitable agents of this type are well known to those skilled in the art. Some are listed below:

(a) fungicides:
   tetramethyl thiuram disulfide (thiuram)
   n-dodecylguanidine acetate (dodine)
   manganese ethylenebisdithiocarbamate (maneb)
   1,4-dichloro-2,5-dimethoxybenzene (chloroneb)
   methyl 1-(butylcarbamoyl)-2-benzimidazolecarbamate (benomyl)
   N-trichloromethylthiotetrahydrophthalimide (captan)
   N-trichloromethylthiophthalimide (folpet)

(b) bactericides:
   tribasic copper sulfate
   steptomycin sulfate (c) acaricides:
   senecioic acid, ester with 2-sec-butyl-4,6-dinitrophenol ("Morocide")
   6 - methyl - 1,3 - dithiolo[2,3 - B]quinoxolin-2-one ("Morestan")
   ethyl 4,4'-dichlorobenzilate (Chlorobenzilate®)
   1,1 - bis(p-chlorophenyl) - 2,2,2 - trichloroethane (Kelthane®)
   bis(pentachloro-2,4-cyclopentadien-lyl) (Pentac®)

(d) nematicides:
   S-methyl 1 - (dimethylcarbamoyl)-N-(methylcarbamoyloxy)-thioformimidate
   S-methyl 1-(dimethylcarbamoyl)-N-(methylcarbamoyloxy)-thioformimidate
   N - isopropylphosphoramidic acid, O - ethyl-O'-[4-"methylthio)-m-tolyl]diester ("Nemacur")

(e) insecticides:
   methyl carbamic acid, ester with oxime of 2-methyl-2-methylthiolpropionaldehyde (Temik®)
   3 - hydroxy - N-methylcrotonamide (dimethylphosphate) ester (Azodrin®)
   methyl carbamic acid, ester with 2,3-dihydro-2,2-dimethyl-7-benzofuranol (Furadan®)
   O - [2,4,5 - trichloro-α-(chloromethyl)benzyl]phosphoric acid, O',O'-dimethyl ester (Gardona®)
   2-mercaptosuccinic acid, diethyl ester, S-ester with thionophosphoric acid, dimethyl ester (Malathion®)
   phosphorothioic acid, O,O-dimethyl, O-p-nitrophenyl ester (methyl parathion)
   methyl carbamic acid, ester with α-naphthol (Sevin®)
   methyl O-(methylcarbamoyl)thiolacetohydroxamate (methomyl)

Application

To be effective the compounds of Formula I must be applied in an amount sufficient to exert the desired pesticidal action. The amounts required to give pest control action are governed by many variables such as temperature, time of year, moisture, type of application, formulation, pest species to be controlled, resistance, and many other factors. Thus it is not possible to state any one method or rate of application which would be generally satisfactory. It is possible, however, to describe generally some of the various methods and rates of application for certain areas of use and to which the compounds of Formula I are best suited.

The compounds of this invention may be applied directly to the pests themselves or to areas visited by or infested with pests. Thus they may be applied to the foliage of plants, soil, seeds or other areas where pests thrive or congregate.

(a) Foliar application.—When used to protect plants by application to the foliage, typical use rates are in the range of .05 to 30 kg. of active ingredient per hectare. Rates of .1 to 15 kg./ha. are preferred and rates of .1 to 5 kg./ha. are most preferred for reasons of convenience and economy. This type of application may need to be repeated at intervals of from 2–20 days.

(b) Seed treatment.—Typical use rates for application to seeds are in the range of .06 gram to 3 kg. of the active compound of this invention per 100 kg. of seed. Preferred rates are in the range of .6 to 600 grams per 100 kg. of seed. Such treatment rates protect the seed during storage and shipping, and also serve to protect the seed and seedling from attack by insects, mites, or nematodes after planting.

(c) Soil application.—Quantities of from .1 to 50 kg./ha. are generally adequate for treating soil in which seeds are to be planted or in which plants are growing. Preferred rates of application are in the range of .3 to 20 kg./ha. These rates may be applied broadcast or in a band centered on the row for protection from soil pests.

(d) Surface application.—The compounds may be applied to the floors and walls of structures such as warehouses, stores, recreation buildings, factories, homes, and animal shelters for control of arthropods which attack or annoy people or domestic animals. Applications may be repeated as needed.

The following examples are provided to further illustrate the invention. References to parts or percentages are by weight unless otherwise specified.

EXAMPLE 1

2-carbamoyloxyimino-3-thiomorpholinone

Part A.—To a mixture of 6.9 parts of 1-ethoxycarbonylformhydroxamyl chloride and 50 parts of water at 20° C. was added over 3–5 minutes 2-aminoethanethiol hydrochloride. The reaction was cooled to about 0° C. at which point a solution of 3.7 parts of sodium hydroxide in 46 parts of water was added dropwise over 2 hours until the pH reaches 7.0. The crystalline product was recrystallized from water furnishing white crystals of 2-oxyimino-3-thiomorpholinone, M.P. 248–250°.

Part B.—To a slurry of 7.3 parts of 2-oxyimino-3-thiomorpholinone in 100 parts of water at 0°–10° can be added slowly and simultaneously over several hours, 3.3 parts of sodium cyanate and 5 parts of concentrated hydrochloric acid. The product can be extracted with an organic solvent such as ethyl acetate, dried over anhydrous magnesium sulfate and evaporated under reduced pressure to furnish 2 - carbamoyloxyimino - 3-thiomorpholinone.

In a similar manner, the aminothiol named on any line in Table I below (or its hydrochloride salt) can be substituted for the 2-aminoethanethiol hydrochloride in Part A of Example 1 above to give a 2-oxyimino-3-keto-1,4-diheterocycle intermediate which when treated according to the procedure of Part B will give the "Product" named on the same line of the table.

EXAMPLE 2

2-methylcarbamoyloxyimino-4-methyl-3-thiomorpholinone

Part A.—To 12.6 parts of 2-N-methylaminoethanethiol hydrochloride in 100 parts of methanol was added 15.2 parts of 1-ethoxycarbonylformhydroxamyl chloride in one portion. Triethylamine (20.2 parts) was then added dropwise at about 40° C. until the pH of the reaction reached 7.0. The reaction was then allowed to stand overnight, was evaporated and treated with hot acetonitrile. After the acetonitrile was cooled, the triethylamine hydrochloride was filtered and the filtrate stripped to furnish a viscous oil which crystallized on standing. The crystals of 2-oxyimino-4-methyl-3-thiomorpholinone were washed with cold water and recrystallized from acetonitrile which produced white needles, M.P. 228–229.5°.

The reaction was run alternatively in the following manner. To a soltuion of 7.6 parts of 1-ethoxycarbonylformhydroxyamyl chloride and 4.5 parts of 2-N-methylaminoethanethiol in 100 parts of methanol which had been standing at room temperature for 2 hours was added dropwise with stirring 5.1 parts of triethylamine. The solution was then refluxed on a steam bath for 1 hour and allowed to slowly evaporate. The large needle-like crystals of 2-oxyimino - 4 - methyl-3-thiomorpholinone which formed were washed with ice water, M.P. 228–229.5° C.

Part B.—To a slurry of 1 part of 2-oxyimino-4-methyl-3-thiomorpholinone in 25 parts of anhydrous acetonitrile containing a trace of "Dabco" was added in one portion 0.43 part of methyl isocyanate after which the reaction was stirred overnight. The reaction was then chilled to —30° and the product 2 - methylcarbamoyloxyimino-4-methyl-2,3-thiomorpholinedione was filtered and recrystallized from 50 parts of ethyl acetate/acetonitrile, 5/1 to afford white crystals, M.P. 146–148.5°.

EXAMPLE 3

2-methylcarbamoyloxyimino-4-methyltetrahydro-1,4-thiazepin-3-one

By the substitution of 2-N-methylaminoethanethiol of Example 2 with an equivalent amount of 2-N-methylaminopropanethiol, one can similarly obtain 2-methylcarbamoyloxyimino-4-methyltetrahydro-1,4-thiazepin-3-one.

EXAMPLE 4

2-allylcarbamoyloxyimino-3-thiomorpholinone

To a slurry of 1.9 parts of 2-oxyimino-3-thiomorpholinone (described in Example 1, Part A) in 20 parts of acetone containing 3 drops of triethylamine was added in one portion 1.2 parts of allyl isocyanate. The reaction was stirred at room temperature overnight, then chilled to 10° C. and filtered. The crystalline product was recrystallized from ethyl acetate to furnish 0.97 part of 2-allylcarbamoyloxyimino-3-thiomorpholinone, M.P. 115–116.5° C.

TABLE I

| Aminothiol | Product |
| --- | --- |
| 2-N-methylaminoethanethiol | 2-carbamoyloxyimino-4-methyl-3-thiomorpholinone. |
| 2-N-hexylaminoethanethiol | 2-carbamoyloxyimino-4-hexyl-3-thiomorpholinone. |
| 2-N-isopropylaminoethanethiol | 2-carbamoyloxyimino-4-isopropyl-3-thiomorpholinone. |
| 2-N-allylaminoethanethiol | 2-carbamoyloxyimino-4-allyl-3-thiomorpholinone. |
| 2-N-(2-butenyl)aminoethanethiol | 2-carbamoyloxyimino-4-(2-butenyl)-3-thiomorpholinone. |
| 2-N-propargylaminoethanethiol | 2-carbamoyloxyimino-4-(propargyl)-3-thiomorpholinone. |
| 2-N-(2-butynyl)aminoethanethiol | 2-carbamoyloxyimino-4-(2-butynyl)-3-thiomorpholinone. |
| 2-N-ethylaminoethanethiol | 2-carbamoyloxyimino-4-ethyl-3-thiomorpholinone. |
| 3-N-ethylaminopropanethiol | 2-carbamoyloxyimino-4-ethyltetrahydro-1,4-thiazepin-3-one. |
| 2-N-methylaminopropanethiol | 2-carbamoyloxyimino-4-methyltetrahydro-1,4-thiazepin-3-one. |
| 2-(N-methylamino)butanethiol | 2-carbamoyloxyimino-4-methyltetrahydro-4H-1,4-thiazocin-3-one. |
| 2-aminobutanethiol | 2-carbamoyloxyimino-tetrahydro-4H-1,4-thiazocin-3-one. |
| 2-(N-butylamino)butanethiol | 2-carbamoyloxyimino-4-butyltetrahydro-4H-1,4-thiazocin-3-one. |
| 2-(N-t-butylamino)ethanethiol | 2-carbamoyloxyimino-4-(t-butyl)-3-thiomorpholinone. |

EXAMPLE 5

2-allylcarbamoyloxyimino-4-methyl-3-thiomorpholinone

To a slurry of 1.6 parts of 2-oxyimino-4-methyl-3-thiomorpholinone in 20 parts of acetone containing 3 drops of triethylamine was added in portion 1.1 parts of allyl isocyanate. The reaction was stirred at room temperature overnight and evaporated under reduced pressure on a hot water bath to furnish 1.7 parts of 2-allylcarbamoyl-oxyimino-4-methyl-3-thiomorpholinone as a clear yellow viscous oil, $N_D^{25}=1.5639$. The oil which exhibited the typical carbamate absorption frequencies at 3225 cm.$^{-1}$, 3300 cm.$^{-1}$ (both N—$\underline{H}$) and 1725 cm.$^{-1}$

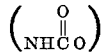

failed to crystallize.

EXAMPLE 6

2-methylcarbamoyloxyimino-3-thiomorpholinone

To a slurry of 3 parts of 2-oxyimino-3-thiomorpholinone prepared as directed in Example 1, Part A, in 30 parts acetonitrile containing a catalytic amount of "Dabco" was added dropwise for 5 minutes at room temperature 1.3 parts of methyl isocyanate. The mildly exothermic reaction was stirred without heating for 6 hours. The 2-methylcarbamoyloxyimino - 3 - thiomorpholinedione was then filtered and recrystallized from n-butanol/acetonitrile, 10/1, which furnished white crystals, M.P. 168–170°.

In a similar manner, the 2-oxyimino-3-keto-1,4-diheterocyclic and the isocyanate named on any line in Table II below can be substituted for the 2-oxyimino-3-keto-1,4-diheterocyclics and isocyanates, respectively, utilized in Examples 2–6 to give the "Product" named on the same line in the table.

TABLE II

| 2-oxyimino-3-keto-1,4-diheterocycle | Isocyanate | Product |
|---|---|---|
| 2-oxyimino-4-methyl-3-thiomorpholinone | Ethyl isocyanate | 2-ethylcarbamoyloxyimino-4-methyl-3-thiomorpholinone. |
| 2-oxyimino-4-hexyl-3-thiomorpholinone | Methyl isocyanate | 2-methylcarbamoyloxyimino-4-hexyl-3-thiomorpholinone. |
| 2-oxyimino-4-isopropyl-3-thiomorpholinone | Propyl isocyanate | 2-propylcarbamoyloxyimino-4-isopropyl-3-thiomorpholinone. |
| 2-oxyimino-4-allyl-3-thiomorpholinone | Methyl isocyanate | 2-methylcarbamoyloxyimino-4-allyl-3-thiomorpholinone. |
| 2-oxyimino-4-(2-butenyl)-3-thiomorpholinone | Allyl isocyanate | 2-allylcarbamoyloxyimino-4-(2-butenyl)-3-thiomorpholinone. |
| 2-oxyimino-4-(propargyl)-3-thiomorpholinone | Methyl isocyanate | 2-methylcarbamoyloxyimino-4-(propargyl)-3-thiomorpholinone. |
| 2-oxyimino-4-(2-butynyl)-3-thiomorpholinone | Ethyl isocyanate | 2-ethylcarbamoyloxyimino-4-(2-butynyl)-3-thiomorpholinone. |
| 2-oxyimino-4-ethyl-3-thiomorpholinone | Allyl isocyanate | 2-allylcarbamoyloxyimino-4-ethyl-3-thiomorpholinone. |
| 2-oxyimino-4-ethyltetrahydro-1,4-thiazepin-3-one | Methyl isocyanate | 2-methylcarbamoyloxyimino-4-ethyltetrahydro-1,4-thiazepin-3-one. |
| 2-oxyimino-4-methyltetrahydro-4H-1,4-thiazocin-3-one | do | 2-methylcarbamoyloxyimino-4-methyltetrahydro-4H-1,4-thiazocin-3-one. |
| 2-oxyimino-tetrahydro-4H-1,4-thiazocin-3-one | Ethyl isocyanate | 2-ethylcarbamoyloxyimino-tetrahydro-4H-1,4-thiazocin-3-one. |
| 2-oxyimino-4-butyl-tetrahydro-4H-1,4-thiazocin-3-one | Allyl isocyanate | 2-allylcarbamoyloxyimino-4-butyl-tetrahydro-4H-1,4-thiazocin-3-one. |
| 2-oxyimino-4-(t-butyl)-3-thiomorpholinone | Methyl isocyanate | 2-methylcarbamoyloxyimino-4-(t-butyl)-3-thiomorpholinone. |

EXAMPLE 7

Dimethylcarbamoyloxyimino-4-methyl-3-thiomorpholinone

To a solution of 1.6 parts of 2-oxyimino-4-methyl-3-thiomorpholinone in 25 parts of anhydrous dioxane under nitrogen was added gradually 0.5 part of 50% sodium hydride in mineral oil. After the evolution of hydrogen subsided, the reaction was refluxed 1 hour after which 1.2 parts of dimethylcarbamyl chloride was added in one portion. The reaction was stirred for 30 minutes, refluxed 30 minutes and then allowed to stir at room temperature overnight. The resulting precipitate was filtered, washed with ice water, and recrystallized from acetonitrile to give 1 part of dimethylcarbamoyloxyimino-4-methyl-3-thiomorpholinone, M.P. 180.5–183° C.

In a similar fashion, the 2 - oxyimino--3-keto-1,4-diheterocyclic and carbamyl chloride named on any line in Table III below can be substituted for the 2-oxyimino-4-methyl-3-thiomorpholinone and dimethylcarbamyl chloride, respectively, shown in Example 7 above to furnish the "Product" named on the same line in the table.

TABLE III

| 2-oxyimino-3-keto-1,4-diheterocycle | Carbamyl chloride | Product |
|---|---|---|
| 2-oxyimino-4-hexyl-3-thiomorpholinone | Dimethylcarbamyl chloride | 2-dimethylcarbamoyloxyimino-4-hexyl-3-thiomorpholinone. |
| 2-oxyimino-4-isopropyl-3-thiomorpholinone | N-methyl-N-ethylcarbamyl chloride | 2-(N-methy-N-ethylcarbamoyloxyimino)-4-isopropyl 3 thiomorpholinone. |
| 2-oxyimino-4-allyl-3-thiomorpholinone | N-methyl-N-allylcarbamyl chloride | 2-(N-methyl-N-allylcarbamoyloxyimino)-4-allyl-3-thiomorpholinone. |
| 2-oxyimino-4-(2-butenyl)-3-thiomorpholinone | N-methyl-N-propylcarbamyl chloride | 2-(N-methyl-N-propylcarbamoyloxyimino)-4-(2-butenyl)-3-thiomorpholinone. |
| 2-oxyimino-4-(propargyl)-3-thiomorpholinone | Dimethylcarbamyl chloride | 2-dimethylcarbamoyloxyimino-4-(propargyl)-3-thiomorpholinone. |
| 2-oxyimino-4-(2-butynyl)-3-thiomorpholinone | do | 2-dimethylcarbamoyloxyimino-4-(2-butynyl)-3-thiomorpholinone. |
| 2-oxyimino-4-ethyl-3-thiomorpholinone | do | 2-dimethylcarbamoyloxyimino-4-ethyl-3-thiomorpholinone. |
| 2-oxyimino-4-ethyltetrahydro-1,4-thiazepin-3-one | do | 2-dimethylcarbamoyloxyimino-4-ethyl-tetrahydro-1,4-thiazepin-3-one. |
| 2-oxyimino-4-methyltetrahydro-4H-1,4-thiazocin-3-one | do | 2-dimethylcarbamoyloxyimino-4-methyl-tetrahydro-4H-1,4-thiazocin-3-one. |
| 2-oxyimino-tetrahydro-4H-1,4-thiazocin-3-one | N-methyl-N-ethylcarbamyl chloride | 2-(N-methyl-N-ethylcarbamoyloxyimino)-tetrahydro-4H-1,4-thiazocin-3-one. |
| 2-oxyimino-4-butyl-tetrahydro-4H-1,4-thiazocin-3-one | do | 2-(N-methyl-N-ethylcarbamoyloxyimino)-4-butyl-tetrahydro-4H-1,4-thiazocin-3-one. |
| 2-oxyimino-4-(t-butyl)-3-thiomorpholinone | do | 2-(N-methyl-N-ethylcarbamoyloxyimino)-4-(t-butyl)-3-thiomorpholinone. |

EXAMPLE 8

(A) High strength wettable powder

| | Percent |
|---|---|
| 2 - methylcarbamoyloxyimino-3-thiomorpholinone | 80 |
| Sodium alkylnaphthalenesulfonate | 2 |
| Low viscosity methyl cellulose | 2 |
| Diatomaceous earth | 16 |

To prepare the above formulation the ingredients can be thoroughly blended, passed through a hammer mill to produce an average particle size under 40 microns, reblended, and sifted through a U.S.S. No. 50 sieve (0.3 mm. openings) before packaging.

(B) Wettable powder

| | Percent |
|---|---|
| 4-methyl - 2,3 - thiomorpholinedione, 2-oxime, ester with methyl carbamic acid | 40 |
| Dioctyl sodium sulfosuccinate | 2 |
| Sodium lignin sulfonate | 3 |
| Sodium silica aluminate | 10 |
| Calcined non-swelling montmorillonite | 45 |

To prepare the above formulation the ingredients can be thoroughly blended, passed through an air mill to produce an average particle size under 15 microns, reblended, and sifted through a U.S.S. No. 50 sieve (0.3 mm. openings) before packaging.

Either of the above formulations can be added to water at the rate of 50 grams active per 100 liters. The roots and lower stems of woody nursery stock infested with the lance nematode (*Hoplolaimus coronatus*) can be dipped in this solution for approximately 5 minutes and when so treated and planted, will grow well.

EXAMPLE 9

Solution

| | Percent |
|---|---|
| 2-methylcarbamoyloxyimino - 4 - ethyl - 3 - thiomorpholinone | 25 |
| Dimethyl formamide | 75 |

The two ingredients can be stirred together to produce a solution suitable for low-volume direct application.

EXAMPLE 10

Oil suspension

| | Percent |
|---|---|
| 2-methylcarbamoyloxyimino - 4 - methyl - 3 - thiomorpholinone | 30 |
| Polyoxyethylene sorbitol heptaoleate | 8 |
| Synthetic fine silica | 1 |
| Paraffinic hydrocarbon oil | 61 |

The ingredients can be combined and sand milled to produce particles essentially all below 5 microns.

This formulation so prepared can be applied to apple trees at a concentration of 400 p.p.m. active ingredient in water to runoff on a two-week schedule for the control of insects and mites. Treatment can be started shortly after "petal fall" and continued to within two weeks of harvest.

EXAMPLE 11

The formulation of Example 10 can be dispersed in water and sprayed by means of a tractor-mounted sprayer at a rate of 1.5 kg. of active ingredient in 50 liters of water per hectare of cotton. Applications can be made on a weekly schedule starting when the plants are about 30 cm. high and continuing until the plants are defoliated at the end of the season. Excellent control of aphids, thrips, mites and boll weevils will be obtained with this spray program.

EXAMPLE 12

Dust

| | Percent |
|---|---|
| 2-methylcarbamoyloxyimino - 3 - thiomorpholinine | 10 |
| Pyrogenic silica | 10 |
| Powdered talc | 80 |

In preparing the above formulation, the solid diluents can be dried by heating to 80° C. in dry air and then allowed to cool. The active ingredient can then be blended with the inerts and hammer milled to produce an average particle size under 40 microns.

The formulation thus prepared can be dusted on a field of potatoes on a 10-day schedule at the rate of 0.5 kg./ha. (active ingredient). Dusting should be initiated when the plants are about 15 cm. in height and continued until the vines become dry in the early fall. Such treatment will give excellent control of both aphids and Colorado potato beetle.

EXAMPLE 13

Granules

| | Percent |
|---|---|
| 2-methylcarbamoyloxyimino - 4 - allyl - 3 - thiomorpholinone | 10 |
| Alkyl naphthalene sulfonic acid, Na salt | 1 |
| Preformed granular diatomaceous silica | 89 |

In preparing the above formulation, the active ingredient and surfactant can be dissolved in methanol and sprayed onto a tumbling bed of preformed granular diatomaceous silica. The product can be dried to yield granules suitable for hand or machine application.

The granular formulation prepared in this manner can be applied in the furrow with corn seed at the time of planting at the rate of 2.5 kg. of active ingredient per 10,000 meters of row. Larvae of the northern corn rootworm, *Diabrotica longicornis*, and the western corn rootworm, *Diabrotica virgifera*, will be controlled.

EXAMPLE 14

Pellets

| | Percent |
|---|---|
| 2-carbamoyloxyimino - 4 - methyl - 3 - thiomorpholinone | 20 |
| Sodium ligninsulfonate | 5 |
| Powdered attapulgite clay | 75 |

To prepare the above formulation the ingredients can be blended and moistened with water to produce a product suitable for pelletizing. This wet material is pelletized and dried.

The pellets so prepared can be sprinkled at the rate of 5 kg. (active ingredient) per 4000 meters of row in the furrow when planting cucumbers. The seeds then can be planted and the furrow closed. The cucumbers will grow free of attack by the root knot nematode, *Meloidogyne incognita*.

EXAMPLE 15

High strength concentrate

| | Percent |
|---|---|
| 2 - methylcarbamoyloxyimino - 4 - methyl - 3 - thiomorpholinone | 97 |
| Silica aerogel | 1 |
| Synthetic amorphous fine silica | 1 |
| Anhydrous magnesium sulfate | 1 |

To prepare the above formulation the ingredients can be blended and ground to produce a material which will essentially all pass through a U.S.S. No. 50 mesh screen (0.3 mm. openings). This material can be shipped or formulated in a number of ways. For example, the following 25% dust can be prepared.

| | Percent |
|---|---|
| High strength concentrate | 26 |
| Pyrophyllite | 74 |

The materials can be thoroughly blended and packaged for use.

This formulation can be applied with conventional dust equipment to a field of tomatoes at the rate of 1.5 kg. of active ingredient per hectare, a total of four applications are made during the season. Such treatment will give excellent control of the southern armyworm (*Prodenia eridania*).

EXAMPLE 16

Aqueous suspension

| | Percent |
|---|---|
| 2 - methylcarbamoyloxyimino - 4 - methyltetrahydro-1,4-thiazepin-3-one | 25.00 |
| Sodium ligninsulfonate | 6.00 |
| Hydrated attapulgite | 2.00 |
| Sodium dihydrogen phosphate | 1.00 |
| Phenyl mercury acetate | 0.25 |
| Water | 65.75 |

In preparing the above formulation, the ingredients can be combined and sand milled to produce particles substantially all below 2 microns.

A 1% (active ingredient) suspension of this formulation can be prepared in 100 liters of water and the resulting suspension can be used for spraying the walls, floor and stalls of a barn for the control of house and stable flies.

I claim:

1. A compound of the formula

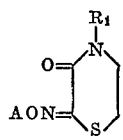

where
A is hydrogen or

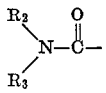

$R_1$ is hydrogen, alkyl of 1–6 carbon atoms, alkenyl of 3–4 carbon atoms, or alkynyl of 3–4 carbon atoms;
$R_2$ is hydrogen, alkyl of 1–3 carbon atoms, or allyl; and
$R_3$ is hydrogen or methyl.

2. A compound of claim 1 wherein $R_1$ is alkyl of 1–3 carbon atoms or allyl; and $R_2$ is hydrogen, alkyl of 1–2 carbon atoms, or allyl.

3. The compound of claim 1 which is 2-methylcarbamoyloxyimino-4-methyl-3-thiomorpholinone.

4. The compound of claim 1 which is 2-methylcarbamoyloxyimino-4-ethyl-3-thiomorpholinone.

5. The compound of claim 1 which is 2-oxyimino-4-methyl-3-thiomorpholinone.

6. The compound of claim 1 which is 2-oxyimino-4-ethyl-3-thiomorpholinone.

References Cited

UNITED STATES PATENTS

| 3,715,353 | 2/1973 | Krapcho | 260—243 |
| 3,725,401 | 4/1973 | Johnson et al. | 260—243 |

JOHN M. FORD, Primary Examiner

U.S. Cl. X.R.

424—246; 260—327 R